(12) United States Patent
Lee et al.

(10) Patent No.: US 8,605,134 B2
(45) Date of Patent: Dec. 10, 2013

(54) VIDEO MONITORING SYSTEM AND METHOD

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 537 days.

(21) Appl. No.: 12/854,908

(22) Filed: Aug. 12, 2010

(65) Prior Publication Data

US 2011/0249101 A1    Oct. 13, 2011

(30) Foreign Application Priority Data

Apr. 8, 2010   (TW) ............................... 99110961 A

(51) Int. Cl.
*H04N 13/02*    (2006.01)

(52) U.S. Cl.
USPC .......................................................... 348/50

(58) Field of Classification Search
USPC .......................................................... 348/50
See application file for complete search history.

(56) References Cited

U.S. PATENT DOCUMENTS

| | | | | |
|---|---|---|---|---|
| 4,523,226 A * | 6/1985 | Lipton et al. | ..................... | 348/49 |
| 4,857,999 A * | 8/1989 | Welsh | ............................. | 725/22 |
| 5,086,354 A * | 2/1992 | Bass et al. | ..................... | 359/465 |
| 5,551,016 A * | 8/1996 | Loeb et al. | ..................... | 713/400 |
| 5,625,410 A * | 4/1997 | Washino et al. | ............. | 348/154 |
| 5,699,057 A * | 12/1997 | Ikeda et al. | ................... | 340/937 |
| 5,910,817 A * | 6/1999 | Ohashi et al. | ................. | 348/159 |
| 5,935,190 A * | 8/1999 | Davis et al. | .................... | 701/119 |
| 6,476,858 B1 * | 11/2002 | Ramirez Diaz et al. | ...... | 348/159 |
| 6,667,764 B1 * | 12/2003 | Wakiyama et al. | ........ | 348/211.6 |
| 6,956,573 B1 * | 10/2005 | Bergen et al. | ................. | 345/473 |
| 7,222,356 B1 * | 5/2007 | Yonezawa et al. | ............ | 725/105 |
| 2001/0031003 A1 * | 10/2001 | Sawhney et al. | ......... | 375/240.14 |
| 2002/0033886 A1 * | 3/2002 | Hatanaka | ...................... | 348/211 |
| 2002/0061064 A1 * | 5/2002 | Ishikawa et al. | ......... | 375/240.12 |
| 2003/0223499 A1 | 12/2003 | Routhier et al. | | |
| 2005/0190975 A1 * | 9/2005 | Porikli et al. | ................. | 382/235 |
| 2005/0259152 A1 * | 11/2005 | Wei | .............................. | 348/159 |
| 2005/0273831 A1 * | 12/2005 | Slomovich et al. | ........... | 725/105 |
| 2006/0013495 A1 * | 1/2006 | Duan et al. | ..................... | 382/235 |
| 2006/0029272 A1 * | 2/2006 | Ogawa | .......................... | 382/154 |
| 2006/0085534 A1 * | 4/2006 | Ralston et al. | ................ | 709/223 |
| 2006/0104620 A1 * | 5/2006 | Ebato | .............................. | 396/55 |
| 2008/0062279 A1 * | 3/2008 | Lin et al. | ..................... | 348/231.3 |
| 2008/0239064 A1 * | 10/2008 | Iwasaki | ........................... | 348/47 |

(Continued)

FOREIGN PATENT DOCUMENTS

| | | |
|---|---|---|
| EP | 0639031 A2 | 2/1995 |
| EP | 0827349 A1 | 3/1998 |

*Primary Examiner* — Sath V Perungavoor
*Assistant Examiner* — Peter D Le
(74) *Attorney, Agent, or Firm* — Altis Law Group, Inc.

(57) ABSTRACT

A method for monitoring a target area using a video monitor device that controls a video camera located at the target area to capture left images and right images of the target area. The video monitor device analyzes each of the left and right images to form a combined image, compresses all of the combined images to generate compressed images, and stores the compressed images into a storage system. When an event happened in the target area, a compressed image corresponding to the event time is obtained from the storage system. The video monitor device decompresses the compressed image to generate a 3D image of the target area, and displays the 3D image on a display device.

14 Claims, 3 Drawing Sheets

(56) References Cited

U.S. PATENT DOCUMENTS

| | | | |
|---|---|---|---|
| 2009/0041336 A1* | 2/2009 | Ku et al. | 382/154 |
| 2009/0195774 A1* | 8/2009 | Kawakami | 356/73 |
| 2009/0201192 A1* | 8/2009 | Tokoro et al. | 342/70 |
| 2010/0208064 A1* | 8/2010 | Liu et al. | 348/143 |
| 2011/0181406 A1* | 7/2011 | Lin | 340/425.5 |

* cited by examiner

VIDEO MONITORING SYSTEM AND METHOD

BACKGROUND

1. Technical Field

Embodiments of the present disclosure relate generally to monitor systems and methods, and more particularly to a video monitoring system and a method for monitoring a target area using the video monitoring system.

2. Description of Related Art

Video monitoring systems may be able to detect moving objects, such as, people, vehicles, for example, to confirm if a moving object is in danger or if some event of interest has happened in a concerned area. Traditionally, 2D video may be obtained by a camera of a target area when a moving object is detected. The video may be directly available for viewing on a display and/or recorded for later viewing. When video is recorded, however, a large amount of memory is required for storage of the video. Further, it is very difficult for an observer to analyze 2D video and fully comprehend movement characteristics of an object.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
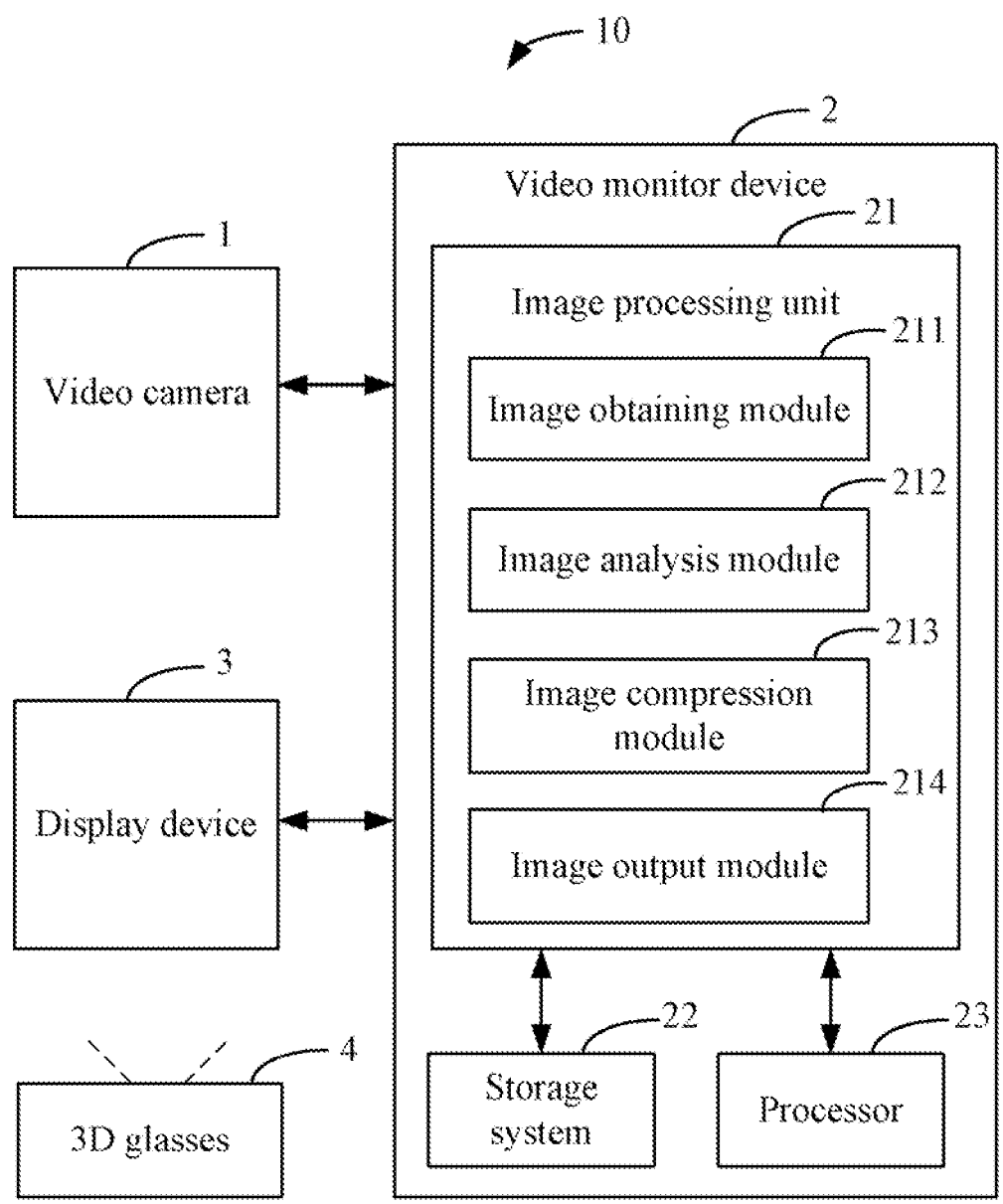
FIG. 1 is a schematic diagram of one embodiment of a video monitoring system.

FIG. 1 is a schematic diagram of one embodiment of a video monitoring system 10. In the embodiment, the video monitoring system 10 can monitor a target area, and detect if an event has happened in the target area. The target area may be a road, a room, a supermarket, a bank, or any other area to be monitored. In one embodiment, the video monitoring system 10 includes a video camera 1, a video monitor device 2, and a display device 3. The video camera 1 is positioned with a view of the target area, and connects to the video monitor device 2 through a network, such as a wide area network (WAN), a local area network (LAN), or any other suitable communication network. The display device 3 connects to the video monitor device 2 via an electrical connection, such as a VGA port, for example. It should be apparent that FIG. 1 illustrates only one example of the video monitoring system 10, and may include more or fewer components than illustrated, or a different configuration of the various components in other embodiments.

The video camera 1 may be a dual-lens camera having a first lens capable of capturing a left image and a second lens capable of capturing a corresponding right image of the target area at the same time. The two lenses arranged side by side as right and left lenses, so that images of the target area are captured from two different angles at the same time for synthesis of 3D images viewable through a 3D glasses 4. In one example with respect to FIG. 3, an image "A" is a left image captured by the left lens, and an image "B" is a right image captured by the right lens.

In one embodiment, the video monitor device 2 may be a computing device capable of processing the 3D images, such as a personal computer, a server, or a workstation. The video monitor device 2 includes an image processing unit 21, a storage system 22, and at least one processor 23. The display device 3 is capable of displaying the 3D images to allow an observer to view the target area. As such, the observer views the 3D images through the 3D glasses 4 to check if an event of interest has happened in the target area.

The image processing unit 21 may include a plurality of functional modules including one or more computerized instructions that are stored in the storage system 22. The storage system 22 may be an internal storage device, such as a random access memory (RAM) for temporary storage of information, and/or a read only memory (ROM) for permanent storage of information. The storage system 22 may also be an external storage device, such as a hard disk, a storage card, or a data storage medium.

In one embodiment, the image processing unit 21 includes an image obtaining module 211, an image analysis module 212, an image compression module 213, and an image output module 214. One or more computerized codes of the function modules 211-214 may be stored in the storage system 22 and executed by the at least one processor 23. In general, the word "module," as used herein, refers to logic embodied in hardware or firmware, or to a collection of software instructions, written in a programming language. The software instructions in the modules may be embedded in firmware, such as an erasable programmable read only memory (EPROM). The modules described herein may be implemented as either software and/or hardware modules and may be stored in any type of computer-readable medium or other storage device.

Figure 3:
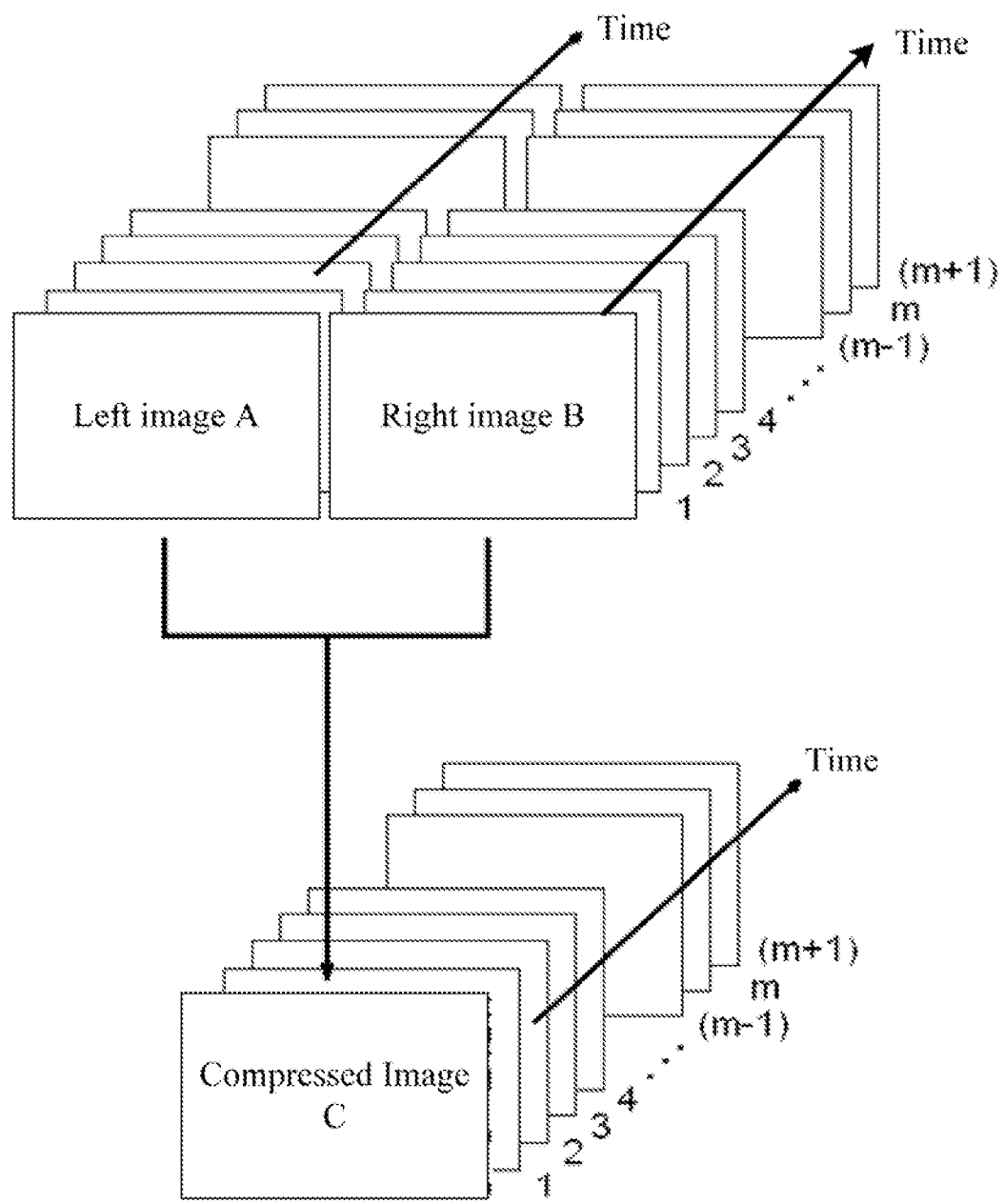
FIG. 3 shows a schematic diagram illustrating one example of analysis of left images and right images.

The image obtaining module 211 is operable to control the video camera to capture a series of left images and right images of the target area when a triggering event (such as movement of an object) happens in the target area, and to obtain the series of left images and right images from the video camera 1. Referring to FIG. 3, the left images may include m number of frames of left images "A", and m number of frames of right images "B." The frames are captured by the video camera 1 at predetermined intervals, for example, the image obtaining module 211 may control the video camera 1 to capture a frame pair (i.e., a left image A and a corresponding right image captured at same time) of the target area every one or two seconds.

The image analysis module 212 is operable to select a left image and the corresponding right image captured at the same time, and compare the left image with the right image to analyze identical image data and different image data of the left image and the right image. In one embodiment, the image analysis module 212 may obtain a plurality of groups of the identical image data and different image data according to the number of the left and right images. For example, m number of frames of left and right images are captured by the video camera 1, the image analysis module 212 may analyze the m number of frames of left and right images to find out m groups of the identical image data and the different image data.

The image compression module 213 is operable to combine the identical image data and the different image data of each of the left and right images to form a combined image, such as the image "C" as shown in FIG. 3. Referring to FIG. 3, m number of frames of left images "A" and m number of corresponding frames of right images "B" are captured by the video camera 1, and the image compression module 213 generates m number of frames of combined images "C." The image compression module 213 is further operable to compress all of the combined images to generate compressed images correspondingly, and to store the compressed images in the storage system 22.

The image output module 214 is operable to determine the time that the triggering event has happened in the target area, and to obtain a compressed image corresponding to the time from the storage system 22. After the compressed image is obtained, the image output module 214 decompresses the compressed image to generate a 3D image of the target area, and outputs the 3D image to be displayed on the display device 3. An observer can then view the 3D images through the 3D glasses 4 to check if the triggering event is an event of particular interest that may require a response of some kind.

Figure 2:
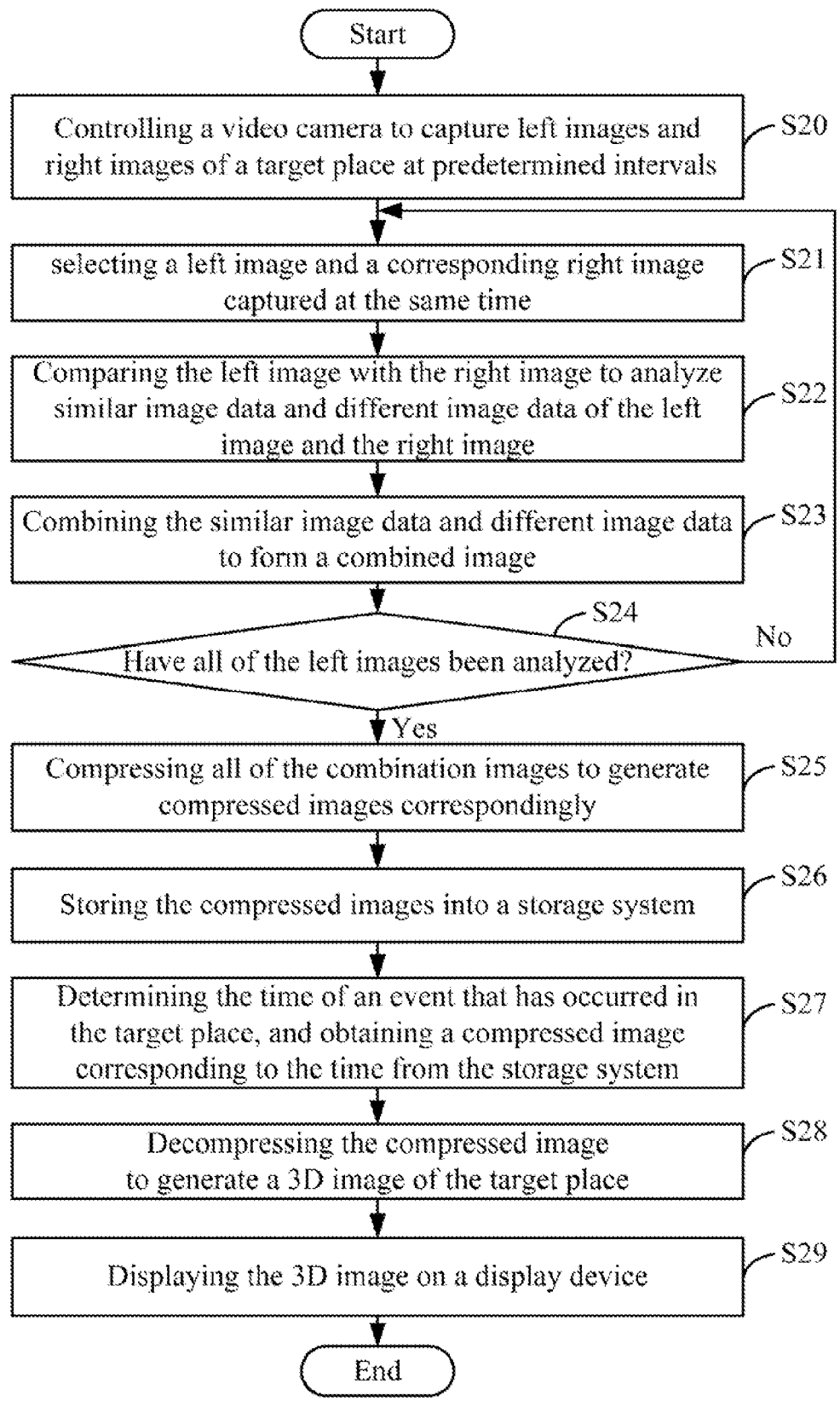
FIG. 2 is a flowchart of one embodiment of a video monitoring method applied to the system of FIG. 1.

FIG. 2 is a flowchart of one embodiment of a video monitoring method using the system 100 of FIG. 1. In the embodiment, the method can monitor a target area, and detect if an event has happened in the target area. Depending on the embodiment, additional blocks may be added, others removed, and the ordering of the blocks may be changed.

In block S20, the image obtaining module 211 controls the video camera 1 to capture a series of left images and right images of the target area when a triggering event happens in the target area. Referring to FIG. 3, the left images may include m number of frames of left images "A", and the right images may include m number of frame of right images "B." The left images and right images are captured by the video camera 1 at predetermined intervals, for example, the image obtaining module 211 may control the video camera 1 to capture a left image and a corresponding right image of the target area at every one or two seconds.

In block S21, the image analysis module 212 selects a left image and a corresponding right image captured at the same time. In block S22, the image analysis module 212 compares the left image with the corresponding right image to analyze identical image data and different image data of the left image and the right image.

In block S23, the image compression module 213 combines the identical image data and the different image data to form a combined image, such as the image "C" as shown in FIG. 3. In block S24, the image analysis module 212 determines if all of the left images have been analyzed. If any left image has not been analyzed, block S21 is repeated. Otherwise, if all of the left images have been analyzed, block S25 is implemented.

In block S25, the image compression module 213 compresses all of the combined images to generate compressed images correspondingly. In block S26, the image compression module 213 stores the compressed images into the storage system 22.

In block S27, the image output module 214 determines the time of the triggering event that has happened in the target area, and obtains a compressed image corresponding to the time from the storage system 22. In block S28, the image output module 214 decompresses the compressed image to generate a 3D image that identical to the combined image.

In block S29, the image output module 214 outputs the 3D image to the display device 3 for viewing. As such, the 3D image is displayed on the display device 3, and the observer may be viewed through the 3D glasses 4 to confirm if something abnormal has happened in the target area.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A video monitor device, comprising:
   a storage system;
   at least one processor; and
   an image processing unit embedded in the video monitor device and executable by the at least one processor, the image processing unit comprising:
   an image obtaining module operable to control a video camera to capture a series of left images and right images of a target area at predetermined intervals;
   an image analysis module operable to select a left image and a corresponding right image captured at the same time from the series of left images and right images, to compare the left image with the right image to analyze identical image data and different image data of the left image and the right image, and to obtain a plurality of groups of the identical image data and the different image data according to a number of the left and right images;
   an image compression module operable to combine the identical image data and the different image data of each of the left images and right images to form a combined image, to compress all of the combined images to generate compressed images correspondingly, and to store the compressed images into the storage system; and
   an image output module operable to determine the time of an event that has occurred in the target area, to obtain a compressed image corresponding to the time from the storage system, to decompress the compressed image to generate a 3D image of the target area, and to display the 3D image on a display device for monitoring of the target area.

2. The video monitor device according to claim 1, wherein the image analysis module is further operable to determine if all of the left images have been analyzed.

3. The video monitor device according to claim 1, wherein the video camera is a dual-lens camera having a first lens capable of capturing the left images and a second lens capable of capturing the right images of the target area at the same time.

4. The video monitor device according to claim 1, wherein the left images and the right images of the target area are synthesis of 3D images viewable through a 3D glasses.

5. The video monitor device according to claim 1, wherein the 3D image displayed on the display device is viewed through a 3D glasses.

6. The video monitor device according to claim 1, wherein video camera is located at the target area, and connects to the video monitor device through a network.

7. A video monitoring method, comprising:
   controlling a video camera located at a target area to capture a series of left images and right images of the target area at predetermined intervals;
   selecting a left image and a corresponding right image captured at the same time;
   comparing the left image with the right image to analyze identical image data and different image data of the left image and the right image, and obtaining a plurality of groups of the identical image data and the different image data according to a number of the left and right images;
   combining the identical image data and the different image data of the left image and the right image to form a combined image;

repeating the selecting step to the combining step, until all of the left images and the right images have been processed;

compressing all of the combined images to generate compressed images, and storing the compressed images into a storage system;

determining the time of an event that has occurred in the target area;

obtaining a compressed image corresponding to the time from the storage system;

decompressing the compressed image to generate a 3D image of the target area; and displaying the 3D image on a display device for monitoring of the target area.

8. The method according to claim 7, wherein the video camera is a dual-lens camera having a first lens capable of capturing the left images and a second lens capable of capturing the right images of the target area at the same time.

9. The method according to claim 8, wherein the left images and the right images of the target area are synthesis of 3D images viewable through a 3D glasses.

10. The method according to claim 7, wherein the 3D image displayed on the display device is viewed through a 3D glasses.

11. A non-transitory computer-readable storage medium having stored thereon instructions that, when executed by a least one processor of a monitor device, causes the monitor device to perform a video monitoring method, the method comprising:

controlling a video camera located at a target area to capture a series of left images and right images of the target area at predetermined intervals;

selecting a left image and a corresponding right image captured at the same time;

comparing the left image with the right image to analyze identical image data and different image data of the left image and the right image, and obtaining a plurality of groups of the identical image data and the different image data according to a number of the left and right images;

combining the identical image data and the different image data of the left image and the right image to form a combined image;

repeating the selecting step to the combining step, until all of the left images and the right images have been processed;

compressing all of the combined images to generate compressed images, and storing the compressed images into a storage system;

determining the time of an event that has occurred in the target area;

obtaining a compressed image corresponding to the time from the storage system;

decompressing the compressed image to generate a 3D image of the target area; and displaying the 3D image on a display device for monitoring of the target area.

12. The non-transitory computer-readable storage medium according to claim 11, wherein the video camera is a dual-lens camera having a first lens capable of capturing the left images and a second lens capable of capturing the right images of the target area at the same time.

13. The non-transitory computer-readable storage medium according to claim 12, wherein the left images and the right images of the target area are synthesis of 3D images viewable through a 3D glasses.

14. The non-transitory computer-readable storage medium according to claim 11, wherein the 3D image displayed on the display device is viewed through a 3D glasses.

* * * * *